(12) United States Patent
Blankenship et al.

(10) Patent No.: US 12,353,329 B2
(45) Date of Patent: Jul. 8, 2025

(54) SYSTEM, APPARATUS AND METHODS FOR DIRECT DATA READS FROM MEMORY

(71) Applicant: Intel Corporation, Santa Clara, CA (US)

(72) Inventors: Robert Blankenship, Tacoma, WA (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 17/645,485

(22) Filed: Dec. 22, 2021

(65) Prior Publication Data

US 2022/0114099 A1    Apr. 14, 2022

(51) Int. Cl.
| | | |
|---|---|---|
| *G06F 12/08* | (2016.01) | |
| *G06F 12/0811* | (2016.01) | |
| *G06F 12/0817* | (2016.01) | |
| *G06F 13/16* | (2006.01) | |
| *G06F 13/42* | (2006.01) | |

(52) U.S. Cl.
CPC ...... *G06F 12/0811* (2013.01); *G06F 12/0828* (2013.01); *G06F 13/1673* (2013.01); *G06F 13/4221* (2013.01)

(58) Field of Classification Search
CPC ............. G06F 12/0811; G06F 12/0828; G06F 13/4221; G06F 13/1673
See application file for complete search history.

(56) References Cited

U.S. PATENT DOCUMENTS

| | | | |
|---|---|---|---|
| 7,996,625 B2 | 8/2011 | Khare et al. | |
| 2010/0281231 A1* | 11/2010 | Krishnan | G06F 13/161 |
| | | | 711/E12.001 |
| 2013/0173901 A1 | 7/2013 | Gay et al. | |
| 2014/0089592 A1 | 3/2014 | Biswas et al. | |
| 2015/0089157 A1 | 3/2015 | Lee et al. | |
| 2016/0179679 A1 | 6/2016 | Morris et al. | |
| 2016/0232107 A1* | 8/2016 | Ros | G06F 12/0808 |
| 2017/0097867 A1 | 4/2017 | Glaser et al. | |
| 2020/0186414 A1 | 6/2020 | Sharma | |
| 2020/0293480 A1 | 9/2020 | Iyer et al. | |

(Continued)

OTHER PUBLICATIONS

Patent Cooperation Treaty, International Search Report and Written Opinion mailed Jan. 5, 2022 in PCT Application No. PCT/US2021/050772 (12 pages).

(Continued)

*Primary Examiner* — Tracy C Chan
(74) *Attorney, Agent, or Firm* — Eversheds Sutherland (US) LLP

(57) ABSTRACT

In an embodiment, a system may include an interconnect device comprising first, second, and third ports; a first processor coupled to the first port; a second processor coupled to the second port; and a system memory coupled to the third port. The interconnect device may be to: receive, from the first processor via the first port, a speculative read request for a data element stored in the system memory, where coherence of the data element is managed by the second processor, receive a direct read request for the data element, merge the direct read request with the speculative read request, and transmit the data element directly to the first processor via the first port. Other embodiments are described and claimed.

20 Claims, 10 Drawing Sheets

(56) References Cited

U.S. PATENT DOCUMENTS

| | | |
|---|---|---|
| 2020/0394150 A1 | 12/2020 | Lanka et al. |
| 2021/0011864 A1 | 1/2021 | Guím Bernat et al. |
| 2021/0112132 A1 | 4/2021 | Paliwal et al. |
| 2021/0232520 A1 | 7/2021 | Choudhary et al. |
| 2021/0349512 A1 | 11/2021 | Bernat et al. |
| 2022/0114099 A1 | 4/2022 | Blankenship et al. |

OTHER PUBLICATIONS

Intel Corporation, Logical PHY Interface (LPIF) Specification, Version 1, Mar. 23, 2019, pp. 1-63.
Intel Corporation, "Compute Express Link, Specification, Mar. 2019, Revision 1.0," Mar. 2019, 206 pages.
Intel Corporation, Compute Express Link™ 2.0 White Paper, 4 pages.
Das Sharma et al., U.S. Appl. No. 17/645,481 entitled System, Apparatus and Methods for Performing Shared Memory Operations filed Dec. 22, 2021 (40 pages).
Choudhary et al., U.S. Appl. No. 17/645,828 entitled Selection of Processing Mode for Receiver Circuit filed Dec. 23, 2021 (47 pages).
Korean Intellectual Property Office, International Search Report and Written Opinion for Appl. No. PCT/US2022/048137 dated Mar. 2, 2023 (11 pages).

* cited by examiner

SYSTEM, APPARATUS AND METHODS FOR DIRECT DATA READS FROM MEMORY

TECHNICAL FIELD

Embodiments relate to accessing memory in a computing environment.

BACKGROUND

Modern computer systems may include any number of components, such as a central processing unit (CPU), memory, chipsets, and/or many other devices coupled together by interconnections (e.g., a computer bus, a network, etc.). An interconnection may transfer data between devices or components inside a computer, as well as between computers. For example, the interconnection may be used to read a data element from a memory, and provide the data element to a processor.

DETAILED DESCRIPTION

Figure 1:
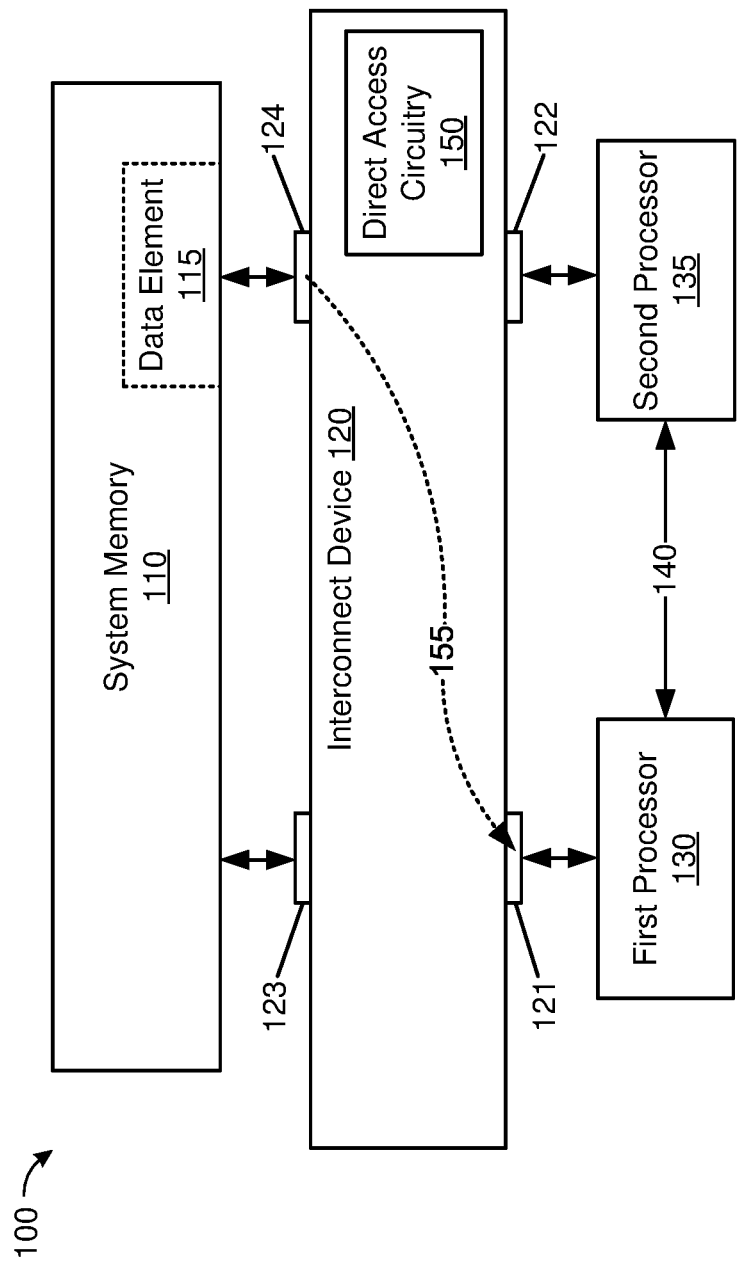
FIG. 1 is a block diagram of an example system in accordance with an embodiment.

Some computing systems may implement interconnection protocols that provide the ability to dynamically add components such as memory, accelerators, and so forth. For example, some systems may implement interconnections and switches in accordance with a Compute Express Link (CXL) specification such as the CXL 1.1 Specification (or any future versions, modifications, variations or alternatives to a CXL specification). An example device that may implement the CXL specification is a memory buffer device (e.g., a memory expander device), which may provide capability for memory expansion and increased memory bandwidth. The memory buffer device may include multiple ports, and may allow multiple processors to access shared memory device(s).

In some examples, the shared memory may be implemented in a distributed manner, with various portions of the memory being associated with particular processors. For example, each processor may be allocated a particular memory address range, and may manage the cache coherence of data in its allocated address range. The processor that manages the cache coherency may be referred to as the "home processor" (or "home agent") of that particular memory range. However, in such situations, performing a memory read may include multiple interactions or "hops," and may therefore involve significant latency and bandwidth consumption. For example, assume that a first processor has a requirement to read data from a memory address that is allocated to a second processor. In this example, performing the read may require four hops, namely the first processor sending a first read command to the second processor via a processor interconnect link, the second processor sending a second read command to the memory buffer device via a CXL link, the memory buffer device sending the data to the second processor via the CXL link, and the second processor then sending the data to the first processor via the processor interconnect link. Therefore, the data read may involve significant latency (e.g., due to the multiple hops), and may require significant bandwidth, power, and cost (e.g., to transfer data across the processor interconnect link, and to size the processor interconnect link accordingly).

In various embodiments described herein, an interconnect device may include circuitry or other logic to allow a processor to directly read data from a memory address with cache coherency that is managed by another processor (i.e., a "home" processor). Further, the interconnect device may handle coherence tasks associated with the direct read, including maintaining a directory, initiating back-invalidate flows, and so forth. In some embodiments, the direct data transfer may not pass through the home processor and a processor interconnect. Accordingly, the direct read may be performed in relatively fewer hops (e.g., two hops), and may thereby involve less latency and bandwidth than conventional approaches. Further, some embodiments may reduce power consumption associated with memory reads, and may reduce the cost associated with sizing the processor interconnect.

FIG. 1—Example System

Referring now to FIG. 1, shown is a block diagram of an example system 100 in accordance with one or more embodiments. The system 100 may include an interconnect device 120 coupled to a first processor 130 via a first port 121, and connected to a second processor 135 via a second port 122. Further, the interconnect device 120 may be coupled to a system memory 110 via a third port 123 and a fourth port 124. In some embodiments, the interconnect device 120 may be a Type 3 CXL device (e.g., a memory buffer device), a Type 2 CXL device, and so forth. Further, the ports 121, 122, 123, 124 may implement a CXL protocol, and may be coupled to CXL interconnections with the corresponding devices 110, 130, 135. The first processor 130 may be connected to the second processor 135 via a processor interconnect 140. In some embodiments, the system 100 may represent a single cache coherency domain.

The system memory 110 may be implemented with any type(s) of computer memory (e.g., dynamic random-access memory (DRAM), static random-access memory (SRAM), non-volatile memory (NVM), a combination of DRAM and NVM, etc.). Each of the first and second processors 130, 135 may be a hardware processing device (e.g., a central processing unit (CPU), a System on a Chip (SoC), and so forth), and may include any number of processing circuits (also referred to herein as "processing cores" or processing engines"). Further, the system memory 110 may be formed of various memory devices.

As illustrated, the interconnect device 120 may include direct read circuitry 125. In some embodiments, the direct read circuitry 125 may allow a processor to directly read data from a memory address associated with another processor. For example, assume that the first processor 130 issues a request to read a data element 115 (e.g., a cache line) stored in the system memory 110. Assume further that the second processor 135 is the home processor of the data element 115 (e.g., the second processor 135 is responsible for cache coherence of the address of data element 115). In some embodiments, the interconnect device 120 may be a CXL device (e.g., a multi-headed memory buffer device, an accelerator device, an input/output device, and so forth).

In some embodiments, the direct read circuitry 125 may include functionality to perform a direct read via a direct data transfer 155 of the data element 115 to the first processor 130. Further, the direct read circuitry 125 may perform coherence tasks associated with the direct read, including maintaining a directory, initiating back-invalidate flows, and so forth. Furthermore, in some embodiments, the processors 130, 135 and the memory 120 may include circuitry or other logic to perform tasks associated with the direct read. In some embodiments, the direct data transfer 155 may not pass through the second processor 135 and the processor interconnect 140. Accordingly, the direct read may be performed in relatively fewer hops (e.g., two hops), and may thereby involve less latency and bandwidth than conventional approaches. The direct read functionality of the system 100 is described further below with reference to FIGS. 2-5.

It is noted that, although some examples are described herein in connection to the Compute Express Link (CXL) specification, embodiments are not limited in this regard. For example, it is contemplated that various embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

Figure 2:
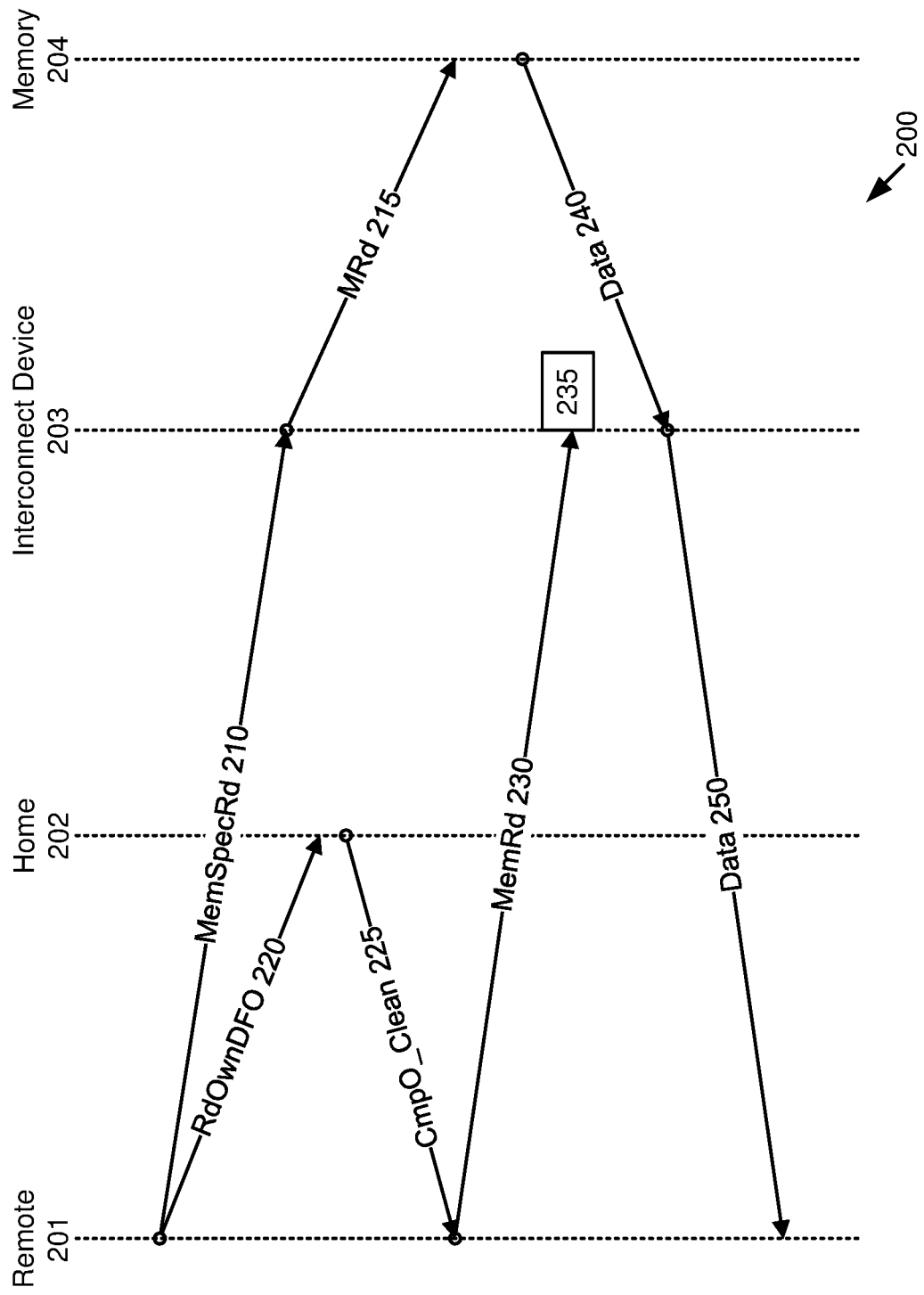
FIG. 2 is an illustration of an example process in accordance with an embodiment.

FIG. 2—First Example Process

Referring now to FIG. 2, shown is an example diagram of a first direct read process 200, in accordance with one or more embodiments. In particular, FIG. 2 illustrates a sequence of data exchanges between a remote processor 201, a home processor 202, an interconnect device 203, and memory 204. The devices 201, 202, 203, 204 may correspond respectively to example implementations of the devices 130, 135, 120, 110 (shown in FIG. 1). In some embodiments, the interconnect device 203 may be a CXL multi-headed memory buffer device (e.g., a memory expander device). The actions described below with reference to the remote processor 201 may be performed by a caching agent included in the remote processor 201. Further, the actions described below with reference to the home processor 202 may be performed by a home agent included in the home processor 202.

The process 200 may begin with the remote processor 201 requesting a data element (e.g., a cache line) from the memory 204. In particular, as shown in FIG. 2, the remote processor 201 may send (i.e., transmit) a speculative read message 210 ("MemSpecRd") to the interconnect device 203. The remote processor 201 may concurrently send a Data Forward Only (DFO) message 220 ("RdOwnDFO") to the home processor 202. In some embodiments, the DFO message 220 requests that the requested data is returned only if it is found in peer caches (i.e., cache-to-cache transfers). If the home processor 202 determines that the requested data is not found in other peer caches, the home processor 202 may send a clean completion message 225 ("CmpO_Clean") to notify the remote processor 201 that the remote processor 201 has exclusive ownership without the data. Accordingly, the remote processor 201 may send a direct memory read message 230 ("MemRd") to the interconnect device 203. Alternatively, if the requested data is found in peer caches, the home processor 202 does not send the clean completion message 225 to the remote processor 201 (not illustrated in FIG. 2). Accordingly, the remote processor 201 may be unable to complete the direct read. Instead, the remote processor 201 may send a conventional read request (i.e., not performing a direct read) to the home processor 202.

As shown in FIG. 2, in response to receiving the speculative read message 210 forom the remote processor 201, the interconnect device 203 may send a memory read request 215 ("MRd") to the memory 204, thereby causing the memory 204 to send a message 240 including the requested data to the interconnect device 203. Further, upon receiving the direct memory read message 230, the interconnect device 203 may perform a merge 235 of the speculative read message 210 and the direct memory read message 230. The interconnect device 203 may send a message 250 including the requested data (i.e., received in message 240) directly to the remote processor 201. In this manner, the data may be transferred directly to the remote processor 201. In some embodiments, the DFO message 220 and the clean completion message 225 may be implemented using a CXL protocol. Further, the remaining messages 210, 215, 230, 240, 250 220 shown in FIG. 2 may be implemented using a processor interconnect protocol (e.g., the Intel® Ultra-Path Interconnect (UPI) protocol).

In some embodiments, the remote processor 201 may not block a snoop (e.g., from a back invalidation channel) while waiting for the response to the direct memory read message 230 (i.e., the message 250 including the requested data). For example, such blocking of a snoop may cause a deadlock condition. Accordingly, upon receiving a snoop, the remote processor 201 may release its exclusive ownership of the requested data, and may submit a conventional read request (i.e., not performing a direct read) to the home processor 202, thereby providing the ownership and the data at the same time.

In some embodiments, the process 200 may be performed for embodiments in which a home agent and a memory controller are located on different dies of a silicon tile-based processor, and a caching agent is located on the same die as the memory controller. Such embodiments may allow the remote agent to directly read from the native memory controller, and thereby avoid passing data on the die-to-die interface. In this manner, such embodiments may reduce the power and die-to-die bandwidth required for co-located caching agent and memory controller data flows.

Figure 3:
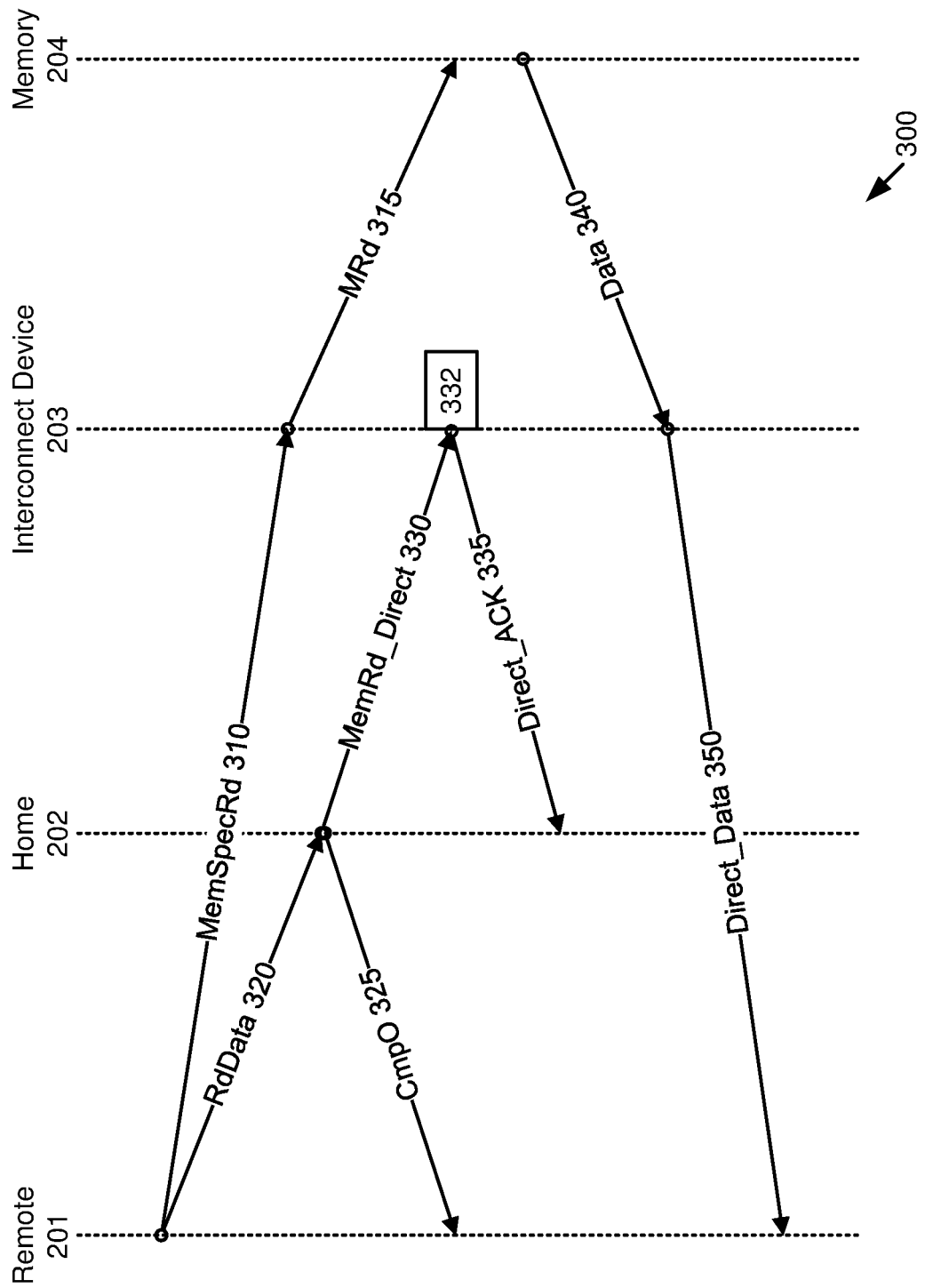
FIG. 3 is an illustration of an example process in accordance with an embodiment.

FIG. 3—Second Example Process

Referring now to FIG. 3, shown is an example diagram of a second direct read process 300, in accordance with one or more embodiments. As shown, FIG. 3 illustrates a sequence of data exchanges between a remote processor 201, a home processor 202, an interconnect device 203, and memory 204 (also shown in FIG. 2). The devices 201, 202, 203, 204 may correspond respectively to example implementations of the devices 130, 135, 120, 110 (shown in FIG. 1). In some embodiments, the interconnect device 203 may be a CXL multi-headed memory buffer device. The actions described below with reference to the remote processor 201 may be performed by a caching agent included in the remote processor 201. Further, the actions described below with reference to the home processor 202 may be performed by a home agent included in the home processor 202.

The process 300 may begin with the remote processor 201 sending a speculative read message 310 ("MemSpecRd") to the interconnect device 203. The remote processor 201 may concurrently send a read data message 320 ("RdData") to the home processor 202. Upon receiving the read data message 320, the home processor 202 may send a completion message back to the remote processor 201, and may also send a direct memory read message 330 ("MemRd Direct") to the interconnect device 203. Further, the home processor 202 may allocate or initiate tracking of the direct memory read message 330. In some embodiments, the direct memory read message 330 may indicate that the requested data is to be sent directly from the memory 204 to the remote processor 201. Further, the direct memory read message 330 may include one or more field to store identification data for the requester (e.g., the requester identifier and address).

Upon receiving the direct memory read message 330, the interconnect device 203 may use the included identification data to match the direct memory read message 330 to the speculative read message 310. The interconnect device 203 may perform a merge 332 of the direct memory read message 330 and the speculative read message 310, and may thereby determine the requester that will receive the data. The interconnect device 203 may send a direct read acknowledgement message 335 ("Direct ACK") to the home processor 202. Upon receiving the direct read acknowledgement message 335, the home processor 202 may deallocate or cease tracking of the memory read message 330. In some embodiments, performing the merge 332 may include matching a requester identifier and address in the messages 310, 330, and thereby determining the tag that is to be returned to the requester. However, if no match is made, the merger fails, and a conventional read request may be performed instead.

As shown in FIG. 3, in response to receiving the speculative read message 310 from the remote processor 201, the interconnect device 203 may send a memory read request 315 ("MRd") to the memory 204, thereby causing the memory 204 to send a message 340 including the requested data to the interconnect device 203. After receiving the message 340, and after performing the merge 332, the interconnect device 203 may send a direct data message 350 ("Direct Data") including the requested data (i.e., received in message 340) directly to the remote processor 201. In this manner, the data may be transferred directly to the remote processor 201. In some embodiments, the direct memory read message 330, the speculative read message 310, and the direct data message 350 may be implemented using a CXL protocol.

Figure 4A:
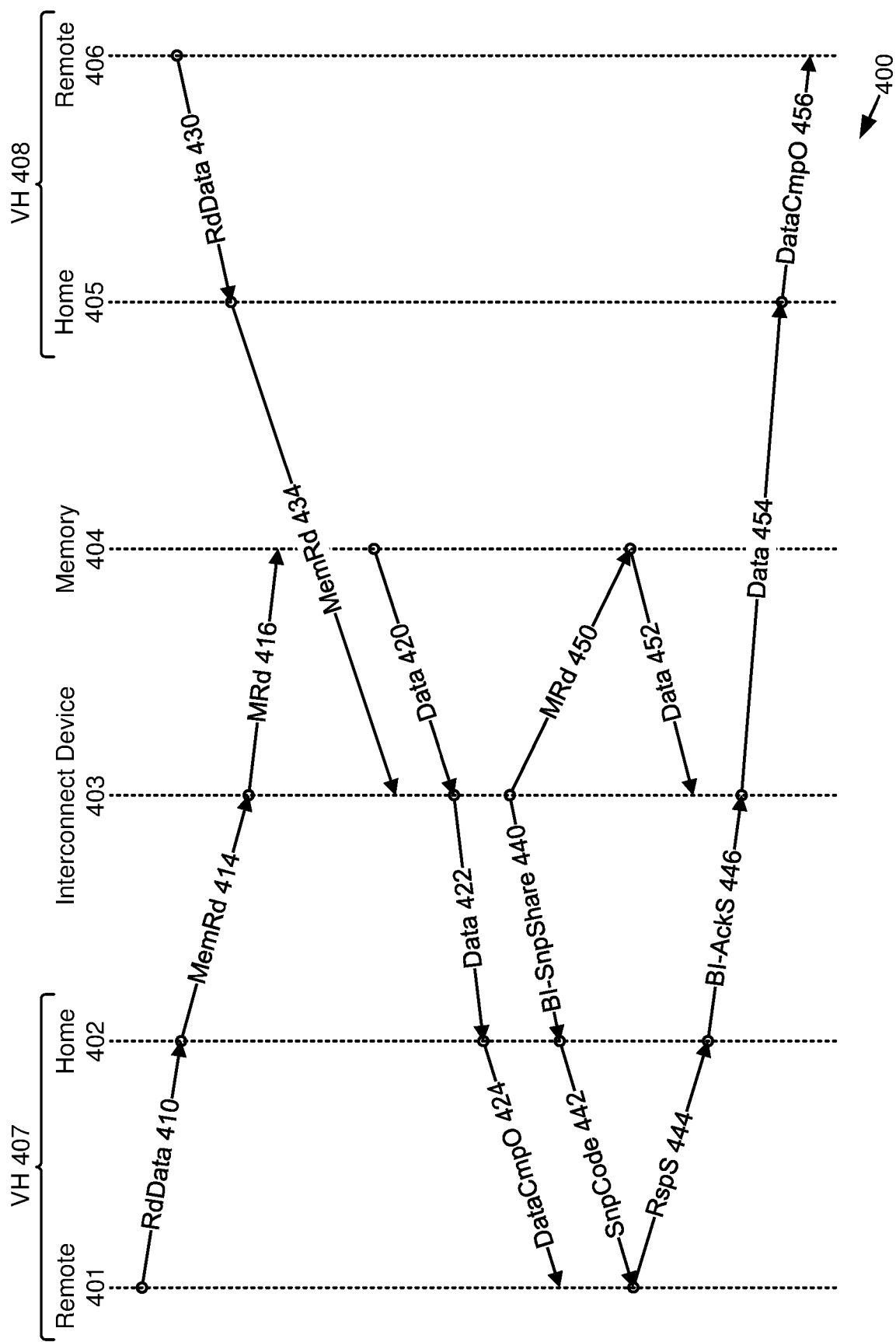
FIG. 4A is an illustration of an example process in accordance with an embodiment.

FIG. 4A—Third Example Process

Referring now to FIG. 4A, shown is an example diagram of a third direct read process 400, in accordance with one or more embodiments. As shown, FIG. 4A illustrates a sequence of data exchanges between a first remote processor 401, a first home processor 402, an interconnect device 403, memory 404, a second home processor 405, and a second remote processor 406. The devices 401, 402, 403, 404 may correspond respectively to example implementations of the devices 130, 135, 120, 110 (shown in FIG. 1). Further, the devices 406, 405 may correspond respectively to example implementations of the devices 130, 135. In some embodiments, the interconnect device 403 may be a CXL multi-headed memory buffer device. The actions described below with reference to the remote processors 401, 406 may be performed by a caching agent included in the remote processors 401, 406. Further, the actions described below with reference to the home processors 402, 405 may be performed by a home agent included in the home processors 402, 405.

In some embodiments, the remote processor 401 and the home processor 402 may be included in a first virtual hierarchy (VH) 407. Further, the remote processor 406 and the home processor 405 may be included in a second virtual hierarchy (VH) 408. In some embodiments, each virtual hierarchy may represent one or more devices connected via a particular link to the interconnect device 403, and may use a separate cache coherency domain. In some examples, the cache coherence within each virtual hierarchy 407, 408 may be managed using a processor interconnect protocol (e.g., the Intel® Ultra-Path Interconnect (UPI) protocol). The interconnect device 403 may include circuitry to resolve coherency across multiple virtual hierarchies. For example, the interconnect device 403 may be a CXL memory buffer device including circuitry and/or other logic to coordinate coherence across the different coherence domains of the first and second virtual hierarchies 407, 408. In some embodiments, the interconnect device 403 may use back invalidate commands to resolve coherence.

As shown in FIG. 4A, the process 400 may begin with the remote processor 401 in the first VH 407 sending a read message 410 to the home processor 402 in the first VH 407. Upon receiving the read message 410, the home processor 402 may send a memory read message 414 to the interconnect device 403. The interconnect device 403 may send a memory read request 416 to the memory 404, thereby causing the memory 404 to send a message 420 including the requested data to the interconnect device 403.

Upon receiving the message 420, the interconnect device 403 may send a data message 422 (including the requested data) to the home processor 402. Further, the interconnect device 403 may update a coherence directory to indicate that the requested data is exclusively owned by the first VH 407 (e.g., "Dir=E@VH407"). In some examples, the coherence directory may be stored in the interconnect device 203, and may be used to coordinate or resolve coherency across the first and second VHs 407, 408. Upon receiving the data message 422, the home processor 402 may send a completion message 424 to the remote processor 401.

As shown in FIG. 4A, a short time after the remote processor 401 in the first VH 407 sends the read message 410, the remote processor 406 in the second VH 408 sends a read message 430 to the home processor 405 in the second VH 408. Assume that the read messages 410, 430 are requesting to read the same memory address. Accordingly, the read messages 410, 430 may represent a conflict to read the same data by the first and second VHs 407, 408.

Upon receiving the read message 430, the home processor 405 may send a memory read message 434 to the interconnect device 403. The interconnect device 403 may determine (e.g., using its internal coherence directory) the conflict with the first VH 407 for the requested data. Accordingly, the interconnect device 403 may send a back invalidate snoop message 440 to request that the first VH 407 change the data from an exclusive coherency state to a shared coherency state, or to release ownership of the data. In some embodiments, the back invalidate snoop message 440 may implement the CXL.memory protocol.

Upon receiving the back invalidate snoop message 440, the home processor 402 may send a snoop message 442 to the remote processor 401. The remote processor 401 may change the data to the shared state, and may send the response message 444 indicating that the data is now in the shared state. Upon receiving the response message 444, the home processor 402 may send the back invalidate ACK 446, thereby notifying the interconnect device 403 that the data is now in the shared state. Accordingly, the interconnect device 403 may send a data message 454 (including the requested data) to the home processor 405. Further, the interconnect device 403 may update its internal coherence directory to indicate that the requested data is shared by the first VH 407 and the second VH 408 (e.g., "Dir=S@VH407, VH408"). Upon receiving the data message 454, the home processor 405 may send a completion message 456 to the remote processor 406.

In some embodiments, the interconnect device 403 may require that all memory writes have ownership before the write occurs. This requirement may prevent dirty data from being written back to memory. For example, the interconnect device 403 may implement the CXL.memory protocol in a back invalidate channel to resolve coherence across different virtual hierarchies. This process may include flushing dirty data using a Request with Data (RwD) command. In some embodiments, the CXL.memory protocol may require that a snoop attribute is set to no operation ("No-Op") for a RwD command in affected memory regions. In this manner, the RwD command may be precluded from causing a back invalidate snoop, thereby preventing the writing of dirty data.

Figure 4B:
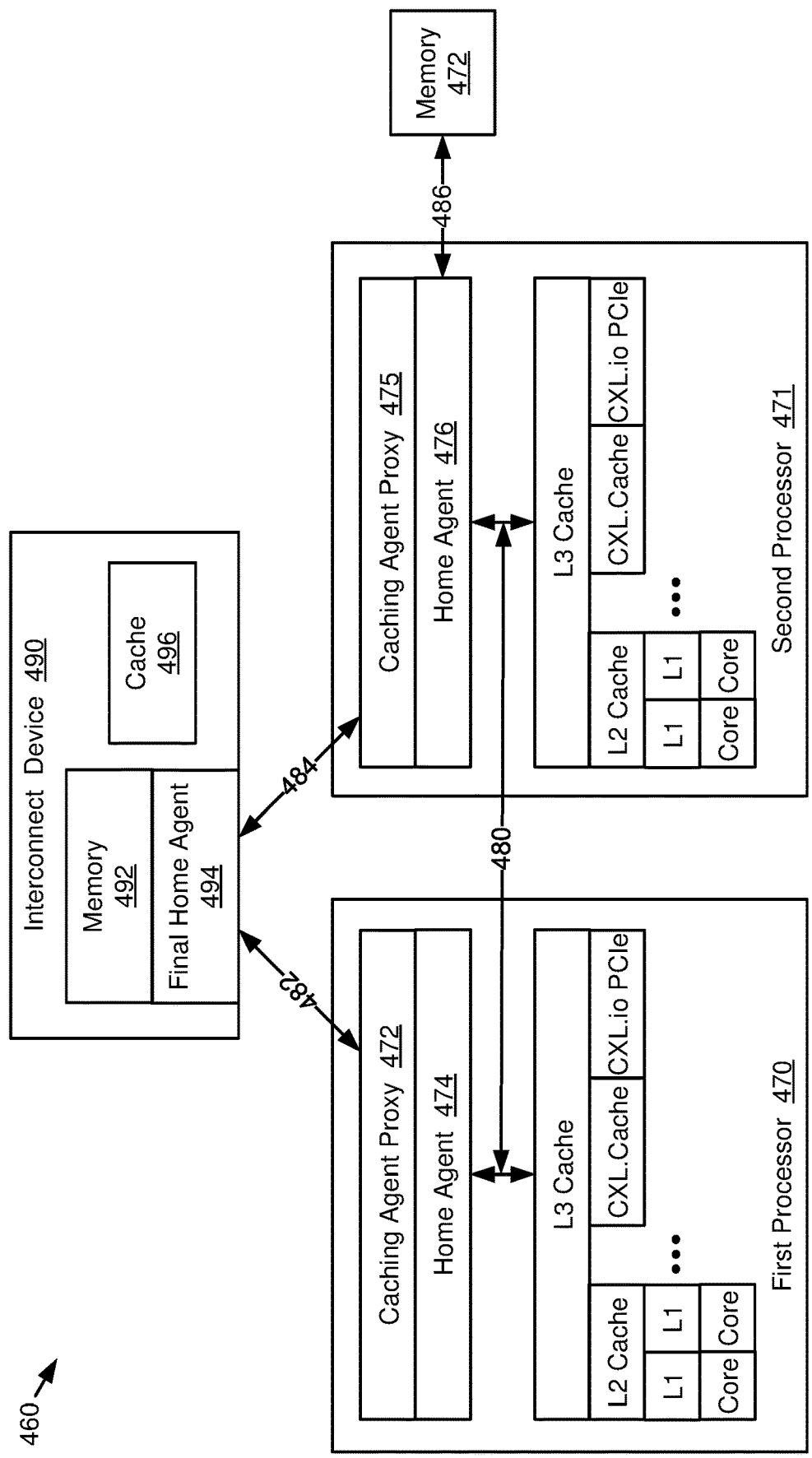
FIG. 4B is a block diagram of an example system in accordance with an embodiment.

FIG. 4B—Example System

Referring now to FIG. 4B, shown is a block diagram of an example system 460 in accordance with one or more embodiments. The system 460 may implement the example process 400 (described above with reference to FIG. 4A). As shown, the system 460 may include a first processor 470, a second processor 471, a memory device 472, and an interconnect device 490. In some embodiments, the interconnect device 490 may be a CXL multi-headed memory buffer device. The memory device 472 may be a memory module (e.g., dynamic random-access memory (DRAM), static random-access memory (SRAM), etc.) or a single headed memory buffer.

As shown, the first processor 470 may include a caching agent 472 and a home agent 474 coupled to a multi-level cache hierarchy (e.g., L1/L2/L3 caches) and multiple processing cores. Further, the second processor 471 may include a caching agent 475 and a home agent 476 coupled to a cache hierarchy and multiple processing cores. The processors 470, 471 may implement the CXL.cache and CXL.io communication protocols. Further, the interconnect device 490 may include memory 492, a cache 496, and a final home agent 494. The caching agents 472, 475, the final home agent 494, and/or the home agents 474, 476 may be implemented at least in part in circuitry.

In some embodiments, the process 400 (shown in FIG. 4A) may be implemented using the components of the system 460. For example, the process 400 may be performed using the caching agent 472 in place of the remote processor 401, the home agent 474 in place of the home processor 402, the caching agent 475 in place of the remote processor 406, the home agent 476 in place of the home processor 405, and the interconnect device 490 in place of the interconnect device 403.

In some embodiments, the processors 470, 471 may be directly coupled by a processor interconnect link 480. The first processor 470 may be coupled to the interconnect device 490 via a first link 482. The first link 482 may form or define a first virtual hierarchy (e.g., VH 407 shown in FIG. 4A). Further, the second processor 471 may be coupled to the interconnect device 490 via a second link 484. The second link 484 may form or define a second virtual hierarchy (e.g., VH 408 shown in FIG. 4A). As shown, the second processor 471 may be directly coupled to the memory device 472 via a third link 486. In some embodiments, the first and second links 482, 484 may implement the CXL.memory protocol.

In some embodiments, the home agents 474 and 476 may include functionality use two coherency management modes for different cache addresses, namely a hierarchical coherency management mode and a flat coherency management mode. In the hierarchical coherency management mode, the home agents 474 and 476 may use the final home agent 494 to coordinate or resolve cache coherency across the two different coherency domains used by the home agents 474 and 476 (e.g., via links 482 and 484). Further, in the flat coherency management mode, each of the home agents 474 and 476 may separately manage cache coherency in its respective coherency domain. For example, the home agent 476 may use the flat coherency management mode to manage coherency in the memory device 472. In some embodiments, each of the home agents 474 and 476 may include two snoop lists, namely a first snoop list identifying cache locations for which to use the hierarchical coherency management mode, and a second snoop list identifying cache locations for which to use the flat coherency management mode.

In some embodiments, the first processor 470 may be linked to additional processor(s) (not shown in FIG. 4B) to form a first processor group. In such an example, the home agent 474 may manage coherency for the first processor group, and may allow the first processor group to use the hierarchical coherency management mode (e.g., using the final home agent 494 to coordinate cache coherency across the different coherency domains). Similarly, the second processor 471 may be linked to other processor(s) (not shown in FIG. 4B) to form a second processor group. In such an example, the home agent 476 may manage coherency for the second processor group, and may allow the second processor group to use the hierarchical coherency management mode.

Figure 5:
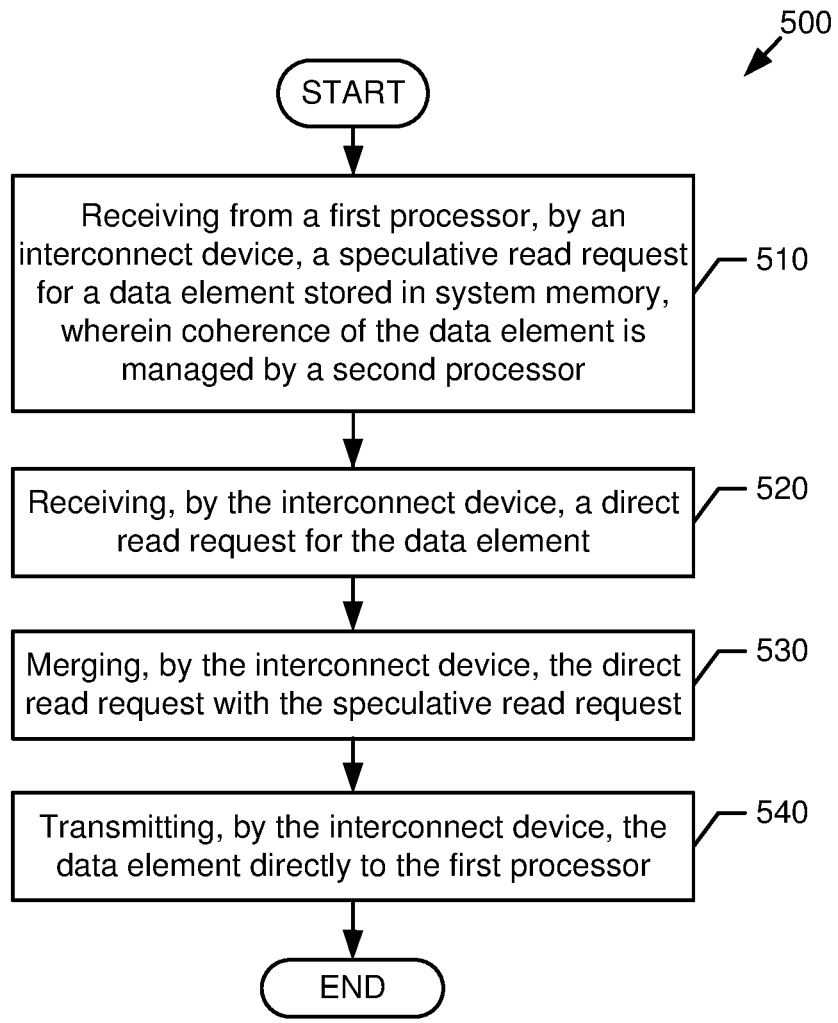
FIG. 5 is a flow diagram of an example method in accordance with one or more embodiments.

FIG. 5—Example Method

Referring now to FIG. 5, shown is a flow diagram of a method 500, in accordance with one or more embodiments. In various embodiments, the method 500 may be performed by processing logic (e.g., processors 130, 135 and/or interconnect device shown in FIG. 1) that may include hardware (e.g., processing device, circuitry, dedicated logic, programmable logic, microcode, etc.), software (e.g., instructions run on a processing device), or a combination thereof. In firmware or software embodiments, the method 500 may be implemented by computer executed instructions stored in a non-transitory machine-readable medium, such as an optical, semiconductor, or magnetic storage device. The machine-readable medium may store data, which if used by at least one machine, causes the at least one machine to fabricate at least one integrated circuit to perform a method.

Block 510 may include receiving from a first processor, by an interconnect device, a speculative read request for a data element stored in system memory, wherein coherence of the data element is managed by a second processor. For example, referring to FIGS. 2-3, the remote processor 201 may send the speculative read message 210 (or speculative read message 310) to the interconnect device 203.

Referring again to FIG. 5, block 520 may include receiving, by the interconnect device, a read request for the data element. For example, referring to FIG. 2, the remote processor 201 may send the direct memory read message 230 to the interconnect device 203. In another example, referring to FIG. 3, the home processor 202 may send the direct memory read message 330 to the interconnect device 203.

Referring again to FIG. 5, block 530 may include merging, by the interconnect device, the read request with the speculative read request. For example, referring to FIG. 2, the interconnect device 203 may perform a merge 235 of the speculative read message 210 and the direct memory read message 230. In another example, referring to FIG. 3, the interconnect device 203 may perform a merge 332 of the direct memory read message 330 and the speculative read message 310.

Referring again to FIG. 5, block 540 may include transmitting, by the interconnect device, the data element directly to the first processor. For example, referring to FIG. 2, the interconnect device 203 may send the message 250 including the requested data directly to the remote processor 201. In another example, referring to FIG. 3, the interconnect device 203 may send a direct data message 350 including the requested data directly to the remote processor 201. After block 540, the method 500 may be completed.

Figure 6:
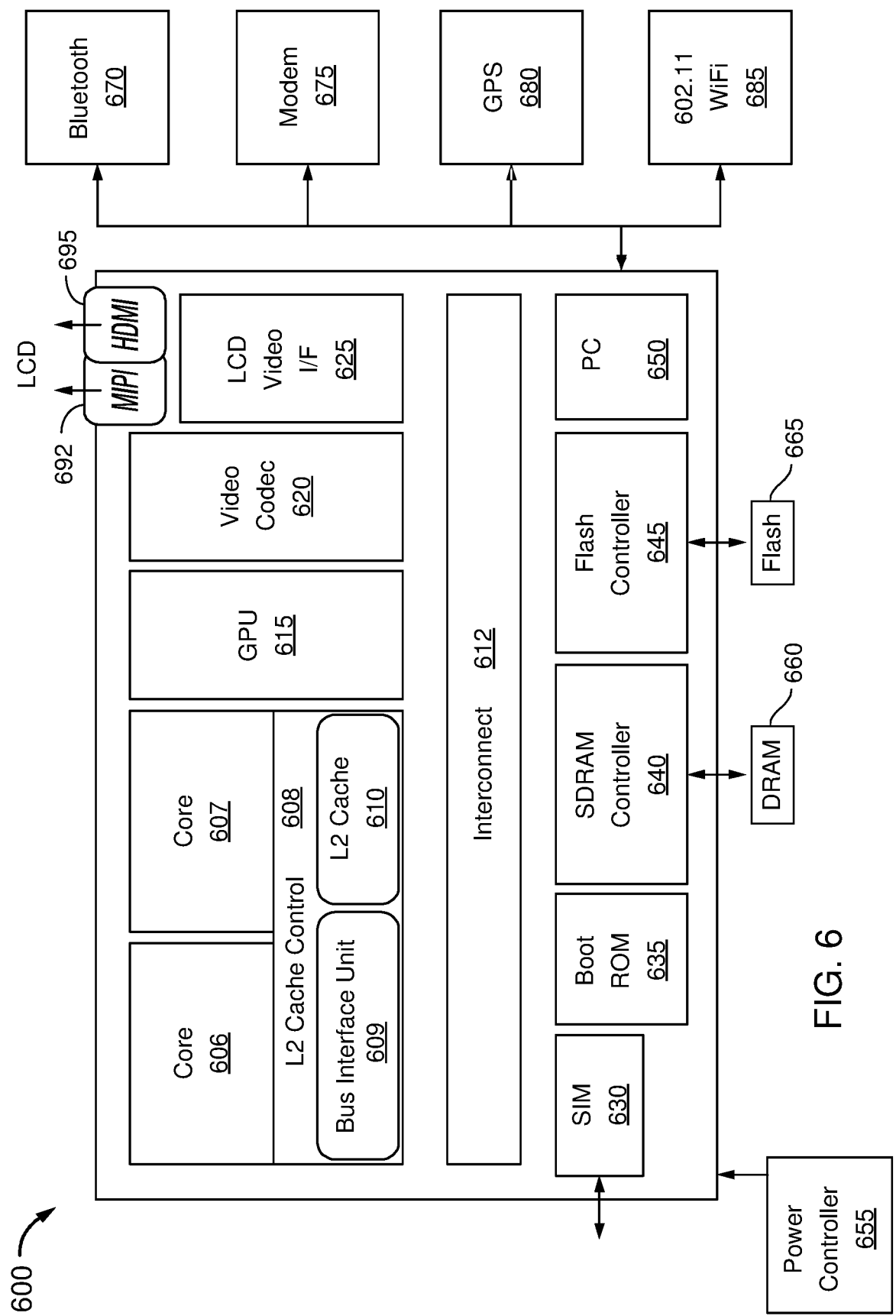
FIG. 6 is a block diagram of an example system in accordance with an embodiment.

FIG. 6—Example System

Referring now to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache controller 608 that is associated with bus interface unit 609 and L2 cache 610 to communicate with other parts of system 600 via an interconnect 612.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash 665), a peripheral controller 650 (e.g., an eSPI interface) to interface with peripherals, video codec 620 and video interface 625 to display and receive input (e.g., touch enabled input), GPU 615 to perform graphics related computations, etc. In addition, the system illustrates peripherals for communication, such as a Bluetooth module 670, 3G modem 675, GPS 680, and WiFi 685. Also included in the system is a power controller 655, which may implement circuitry described herein to perform CXL-based power sharing in accordance with an embodiment. Further illustrated in FIG. 6, system 600 may additionally include interfaces including a MIPI interface 692, e.g., to a display and/or an HDMI interface 695 also which may couple to the same or a different display.

Figure 7:
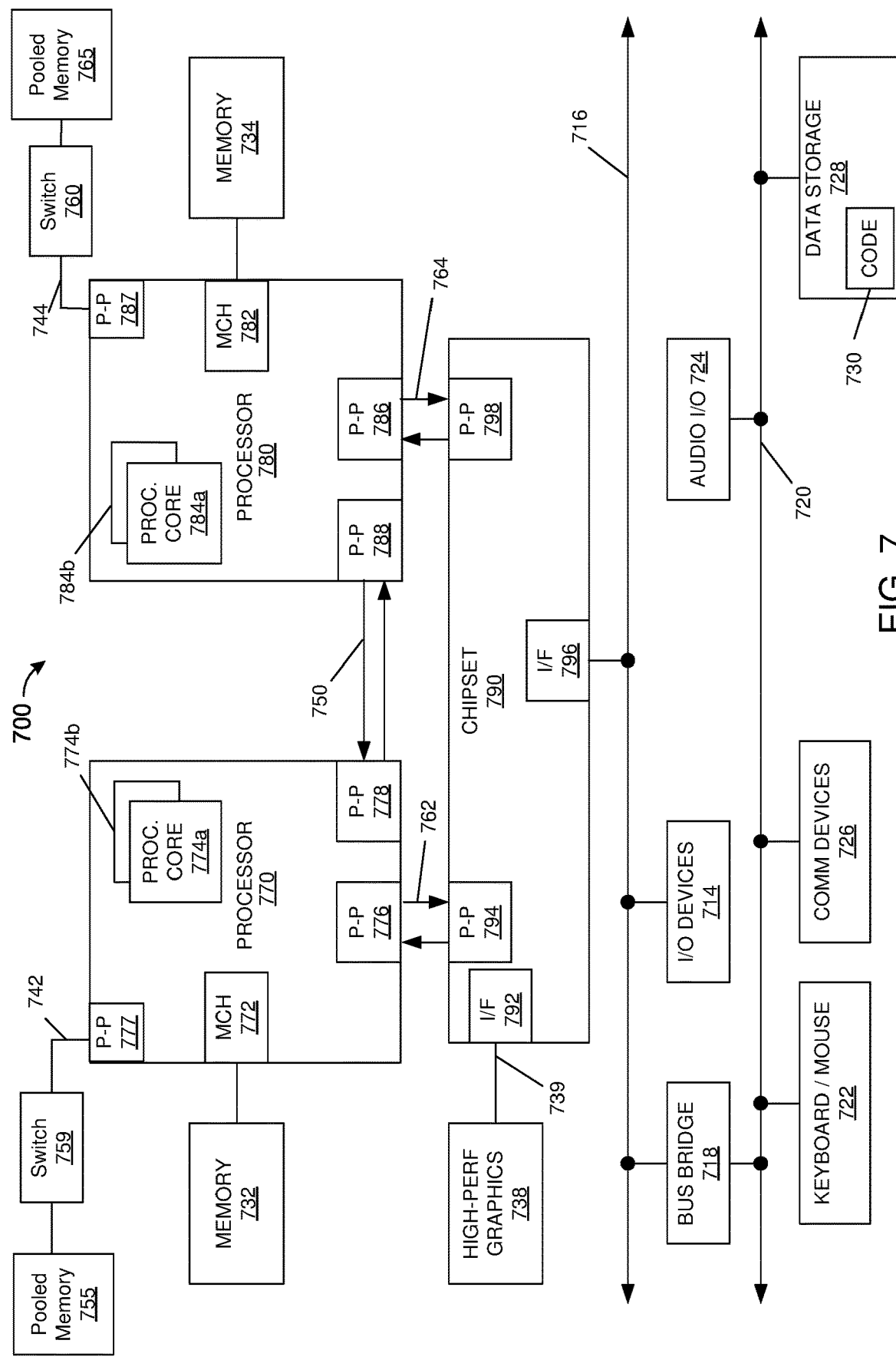
FIG. 7 is a block diagram of an example system in accordance with an embodiment.

FIG. 7—Example System

Referring now to FIG. 7, shown is a block diagram of a system in accordance with another embodiment such as an edge platform. As shown in FIG. 7, multiprocessor system 700 includes a first processor 770 and a second processor 780 coupled via an interconnect 750, which in an embodiment can be an optical interconnect that communicates with optical circuitry (which may be included in or coupled to processors 770). As shown in FIG. 7, each of processors 770 and 780 may be many core processors including representative first and second processor cores (i.e., processor cores 774a and 774b and processor cores 784a and 784b).

In the embodiment of FIG. 7, processors 770 and 780 further include point-to point interconnects 777 and 787, which couple via interconnects 742 and 744 (which may be CXL buses) to switches 759 and 760. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

Figure 8:
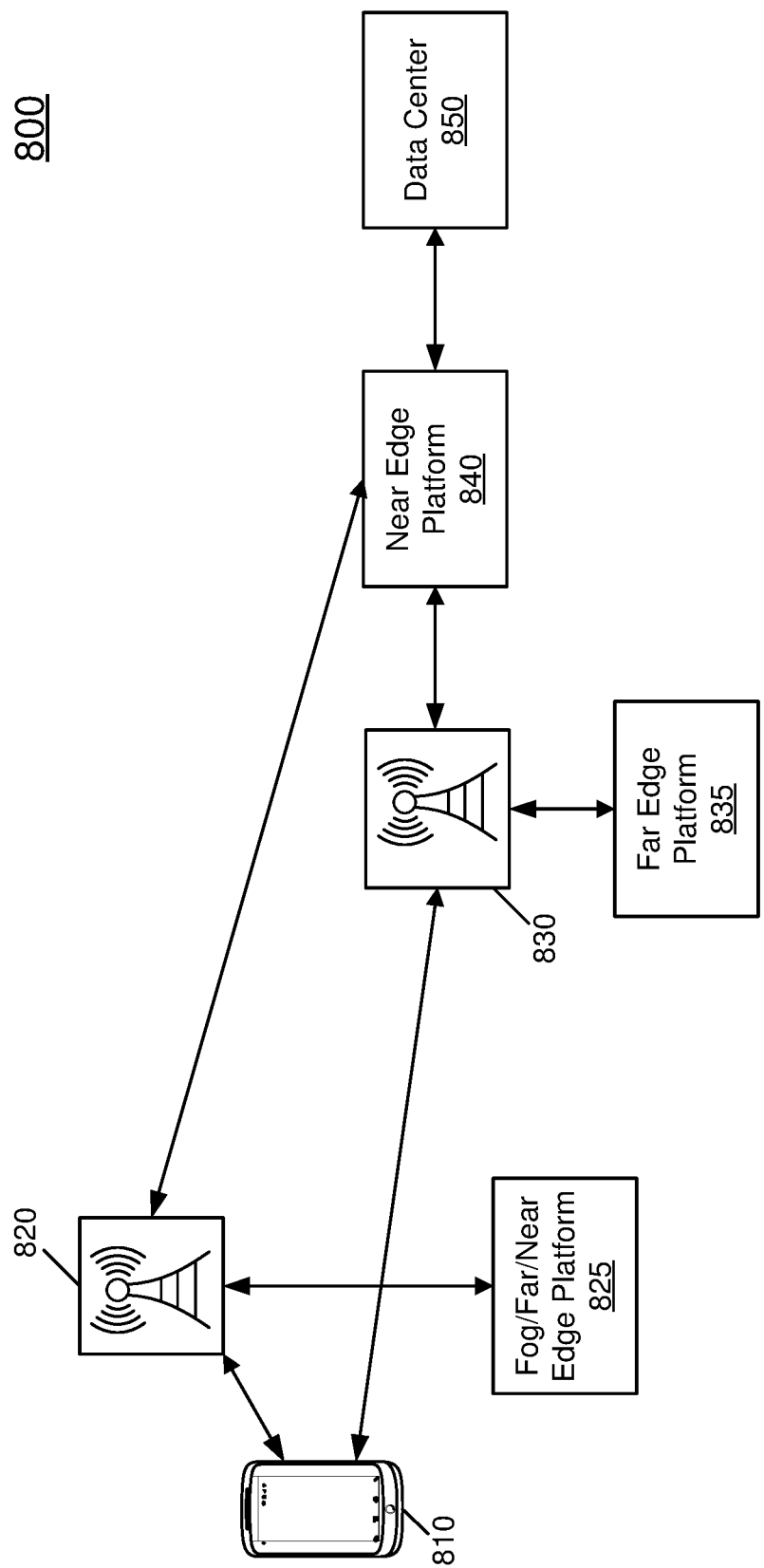
FIG. 8 is a block diagram of an example system in accordance with an embodiment.

FIG. 8—Example System

Embodiments as described herein can be used in a wide variety of network architectures. Referring now to FIG. 8, shown is a block diagram of a network architecture in accordance with another embodiment of the present invention. As shown in FIG. 8, network architecture 800 includes various computing platforms that may be located in a very wide area.

In the high-level view of FIG. 8, network architecture 800 includes a representative device 810, such as a smartphone. This device may communicate via different radio access networks (RANs), including a RAN 820 and a RAN 830. RAN 820 in turn may couple to a platform 825, which may be an edge platform such as a fog/far/near edge platform, and which may leverage embodiments herein. Other requests may be handled by a far edge platform 835 coupled to RAN 830, which also may leverage embodiments.

As further illustrated in FIG. 8, another near edge platform 840 may couple to RANs 820, 830. Note that this near edge platform may be located closer to a data center 850, which may have a large amount of computing resources. By pushing messages to these more remote platforms, greater latency is incurred in handling requests on behalf of edge device 810. Understand that one more of the platforms shown in FIG. 8 may incorporate embodiments to perform CXL-based power sharing as described herein.

Figure 9:
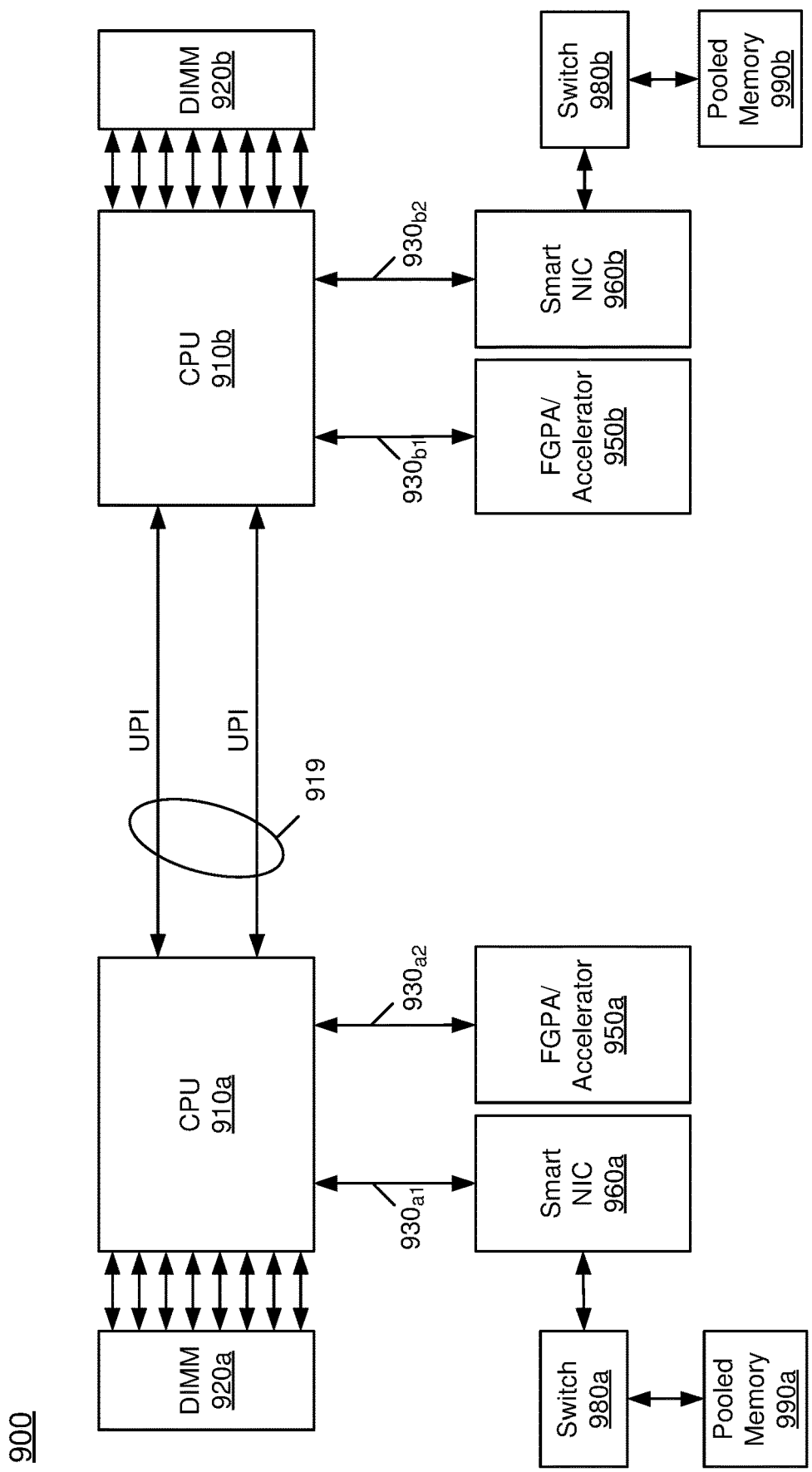
FIG. 9 is a block diagram of an example system in accordance with an embodiment.

FIG. 9—Example System

Referring now to FIG. 9, shown is a block diagram of a system 900 in accordance with another embodiment of the present invention. As shown in FIG. 5, the system 900 may be any type of computing device, and in one embodiment may be a server system. In the embodiment of FIG. 9, system 900 includes multiple CPUs 910*a,b* that in turn couple to respective system memories 920*a,b* which in embodiments may be implemented as DIMMs such as double data rate (DDR) memory, persistent or other types of memory. Note that CPUs 910 may couple together via an interconnect system 915 such as an Intel® Ultra Path Interconnect or other processor interconnect technology.

To enable coherent accelerator devices and/or smart adapter devices to couple to CPUs 910 by way of potentially multiple communication protocols, a plurality of interconnects 930*a*1-*b*2 may be present. In an embodiment, each interconnect 930 may be a given instance of a CXL.

In the embodiment shown, respective CPUs 910 couple to corresponding field programmable gate arrays (FPGAs)/accelerator devices 950*a,b* (which may include GPUs, in one embodiment. In addition CPUs 910 also couple to smart NIC devices 960*a,b*. In turn, smart NIC devices 960*a,b* couple to switches 980*a,b* (e.g., CXL switches in accordance with an embodiment) that in turn couple to a pooled memory 990*a,b* such as a persistent memory. In embodiments, switches 980 may implement circuitry described herein to perform methods as described herein. Of course, embodiments are not limited to switches and the techniques described herein may be performed by other entities of a system, including CPUs 910.

The following clauses and/or examples pertain to further embodiments.

In Example 1, a system for data transfer may include: an interconnect device comprising first, second, and third ports; a first processor coupled to the first port; a second processor coupled to the second port; and a system memory coupled to the third port. The interconnect device may be to: receive, from the first processor via the first port, a speculative read request for a data element stored in the system memory, wherein coherence of the data element is managed by the second processor, receive a direct read request for the data element, merge the direct read request with the speculative read request, and transmit the data element directly to the first processor via the first port.

In Example 2, the subject matter of Example 1 may optionally include that the interconnect device is to: in response to a receipt of the speculative read request, send a memory read request to the system memory via the third port; and receive the data element from the system memory via the third port.

In Example 3, the subject matter of Examples 1-2 may optionally include that the interconnect device is to receive the direct read request from the first processor via the first port.

In Example 4, the subject matter of Examples 1-3 may optionally include that the interconnect device is to: receive the direct read request from the second processor via the second port; and transmit an acknowledgement of the direct read request to the second processor via the second port.

In Example 5, the subject matter of Examples 1-3 may optionally include that the interconnect device is to merge the direct read request with the speculative read request based on a comparison of at least one identifier included the direct read request and the speculative read request.

In Example 6, the subject matter of Examples 1-5 may optionally include that: the first processor is to send a read data message to the second processor; the second processor is to, in response to a receipt of the read data message, send a completion message to the first processor; and the first processor is to, in response to a receipt of the completion message, send the direct read request to the interconnect device.

In Example 7, the subject matter of Examples 1-6 may optionally include that the first processor and the second processor are coupled by a processor interconnect link, and that the data element does not pass through the processor interconnect link.

In Example 8, the subject matter of Examples 1-7 may optionally include that the interconnect device comprises a multi-headed memory buffer device.

In Example 9, the subject matter of Examples 1-8 may optionally include that the direct read request and the speculative read request comprise Compute Express Link (CXL) protocol messages.

In Example 10, an apparatus for data transfer may include: a first interconnect port to couple to a first processor; a second interconnect port to couple to a second processor; a third interconnect port to couple to a system memory; and a direct read circuit. The direct read circuit may be to: receive, from the first processor, a speculative read request for a data element stored in the system memory, where coherence of the data element is managed by the second processor, receive a direct read request for the data element, merge the direct read request with the speculative read request, and transmit the data element directly to the first processor via the first interconnect port.

In Example 11, the subject matter of Example 10 may optionally include that the apparatus comprises a multi-headed memory buffer device.

In Example 12, the subject matter of Examples 10-11 may optionally include that the direct read circuit is to: in response to a receipt of the speculative read request, send a memory read request to the system memory; and receive the data element from the system memory.

In Example 13, the subject matter of Examples 10-12 may optionally include that the direct read circuit is to receive the direct read request from the first processor via the first interconnect port.

In Example 14, the subject matter of Examples 10-13 may optionally include that the direct read circuit is to: receive the direct read request from the second processor via the second interconnect port; and transmit an acknowledgement of the direct read request to the second processor.

In Example 15, the subject matter of Examples 10-14 may optionally include that the direct read circuit is to merge the direct read request with the speculative read request based on a comparison of at least one identifier included the direct read request and the speculative read request.

In Example 16, the subject matter of Examples 10-15 may optionally include that the direct read request and the speculative read request comprise Compute Express Link (CXL) protocol messages.

In Example 17, a system for data transfer may include: a first processor associated with a first coherency domain; a second processor associated with a second coherency domain; and an interconnect device coupled to the first processor, the second processor, and the system memory, where each of the first processor and the second processor comprise coherency circuitry to select between a hierarchical coherency management mode and a flat coherency management mode, where the hierarchical coherency management mode comprises coordination by the interconnect device of coherency across the first coherency domain and the second coherency domain; and where the flat coherency management mode comprises management of coherency in a single coherency domain by the coherency circuitry.

In Example 18, the subject matter of Example 17 may optionally include that the interconnect device is to: receive a direct read request for a data element from the first processor; coordinate coherency of the data element across the first coherency domain and the second coherency domain; send a back invalidate snoop message to modify a coherency state of the data element in at least one of the first coherency domain and the second coherency domain; and transmit the data element directly to the first processor via the first interconnect port.

In Example 19, the subject matter of Examples 17-18 may optionally include that the interconnect device comprises a Compute Express Link (CXL) multi-headed memory buffer device, and that the interconnect device is to update an internal directory to indicate a coherency state of the data element in at least one of the first coherency domain and the second coherency domain.

In Example 20, the subject matter of Examples 17-19 may optionally include that each of the first processor and the second processor comprise: a first list to identify cache locations associated with the hierarchical coherency management mode; and a second list to identify cache locations associated with the flat coherency management mode.

In Example 21, an apparatus for data transfer may include: means for receiving a speculative read request for a data element stored in the system memory; means for receiving a direct read request for the data element; means for merging the direct read request with the speculative read request; and means for transmitting the data element directly to the first processor via the first port.

In Example 22, the subject matter of Example 21 may optionally include: means for, in response to a receipt of the speculative read request, sending a memory read request; and means for receiving the data element.

In Example 23, the subject matter of Examples 21-22 may optionally include: means for receiving the direct read request; and means for transmitting an acknowledgement of the direct read request.

In Example 24, the subject matter of Examples 21-23 may optionally include means for merging the direct read request with the speculative read request based on a comparison of at least one identifier included the direct read request and the speculative read request.

In Example 25, the subject matter of Examples 21-24 may optionally include that the direct read request and the speculative read request comprise Compute Express Link (CXL) protocol messages.

In various embodiments described herein, an interconnect device may include circuitry or other logic to allow a processor to directly read data from a memory address with cache coherency that is managed by another processor (i.e., a "home" processor). Further, the interconnect device may handle coherence tasks associated with the direct read, including maintaining a directory, initiating back-invalidate flows, and so forth. In some embodiments, the direct data transfer may not pass through the home processor and a processor interconnect. Accordingly, the direct read may be performed in relatively fewer hops (e.g., two hops), and may thereby involve less latency and bandwidth than conventional approaches. Further, some embodiments may reduce power consumption associated with memory reads, and may reduce the cost associated with sizing the processor interconnect.

Note that, while FIGS. 1-9 illustrate various example implementations, other variations are possible. For example, the examples shown in FIGS. 1-9 are provided for the sake of illustration, and are not intended to limit any embodiments. Specifically, while embodiments may be shown in simplified form for the sake of clarity, embodiments may include any number and/or arrangement of components. For example, it is contemplated that some embodiments may include any number of components in addition to those shown, and that different arrangement of the components shown may occur in certain implementations. Furthermore, it is contemplated that specifics in the examples shown in FIGS. 1-9 may be used anywhere in one or more embodiments.

Understand that various combinations of the above examples are possible. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
an interconnect device comprising first, second, and third ports;
a first processor coupled to the first port;
a second processor coupled to the second port; and
a system memory coupled to the third port;
wherein the interconnect device is to:
receive, from the first processor via the first port, a speculative read request for a data element stored in the system memory, wherein coherence of the data element is managed by the second processor,
receive a direct read request for the data element,
merge the direct read request with the speculative read request, and transmit the data element directly to the first processor via the first port.

2. The system of claim 1, wherein the interconnect device is to:
in response to a receipt of the speculative read request, send a memory read request to the system memory via the third port; and
receive the data element from the system memory via the third port.

3. The system of claim 1, wherein the interconnect device is to:
receive the direct read request from the first processor via the first port.

4. The system of claim 1, wherein the interconnect device is to:
receive the direct read request from the second processor via the second port; and
transmit an acknowledgement of the direct read request to the second processor via the second port.

5. The system of claim 1, wherein the interconnect device is to:
merge the direct read request with the speculative read request based on a comparison of at least one identifier included the direct read request and the speculative read request.

6. The system of claim 1, wherein:
the first processor is to send a read data message to the second processor;
the second processor is to, in response to a receipt of the read data message, send a completion message to the first processor; and
the first processor is to, in response to a receipt of the completion message, send the direct read request to the interconnect device.

7. The system of claim 1, wherein the first processor and the second processor are coupled by a processor interconnect link, and wherein the data element does not pass through the processor interconnect link.

8. The system of claim 1, wherein the interconnect device comprises a multi-headed memory buffer device.

9. The system of claim 1, wherein the direct read request and the speculative read request comprise Compute Express Link (CXL) protocol messages.

10. An apparatus comprising:
a first interconnect port to couple to a first processor;
a second interconnect port to couple to a second processor;
a third interconnect port to couple to a system memory; and
a direct read circuit to:
receive, from the first processor, a speculative read request for a data element stored in the system memory, wherein coherence of the data element is managed by the second processor,
receive a direct read request for the data element,
merge the direct read request with the speculative read request, and
transmit the data element directly to the first processor via the first interconnect port.

11. The apparatus of claim 10, wherein the apparatus comprises a multi-headed memory buffer device.

12. The apparatus of claim 10, wherein the direct read circuit is to:
in response to a receipt of the speculative read request, send a memory read request to the system memory; and
receive the data element from the system memory.

13. The apparatus of claim 10, wherein the direct read circuit is to:
receive the direct read request from the first processor via the first interconnect port.

14. The apparatus of claim 10, wherein the direct read circuit is to:
receive the direct read request from the second processor via the second interconnect port; and
transmit an acknowledgement of the direct read request to the second processor.

15. The apparatus of claim 10, wherein the direct read circuit is to:
merge the direct read request with the speculative read request based on a comparison of at least one identifier included the direct read request and the speculative read request.

16. The apparatus of claim 10, wherein the direct read request and the speculative read request comprise Compute Express Link (CXL) protocol messages.

17. A system comprising:
a first processor associated with a first coherency domain;
a second processor associated with a second coherency domain; and
an interconnect device coupled to the first processor, the second processor, and the system memory,
wherein each of the first processor and the second processor comprise coherency circuitry to select between a hierarchical coherency management mode and a flat coherency management mode,
wherein the hierarchical coherency management mode comprises coordination by the interconnect device of coherency across the first coherency domain and the second coherency domain; and
wherein the flat coherency management mode comprises management of coherency in a single coherency domain by the coherency circuitry.

18. The system of claim 17, wherein the interconnect device is to:
receive a direct read request for a data element from the first processor;
coordinate coherency of the data element across the first coherency domain and the second coherency domain;
send a back invalidate snoop message to modify a coherency state of the data element in at least one of the first coherency domain and the second coherency domain; and
transmit the data element directly to the first processor via the first interconnect port.

19. The system of claim 18, wherein the interconnect device comprises a Compute Express Link (CXL) multi-headed memory buffer device, and wherein the interconnect device is to update an internal directory to indicate a coherency state of the data element in at least one of the first coherency domain and the second coherency domain.

20. The system of claim 17, wherein each of the first processor and the second processor comprise:
a first list to identify cache locations associated with the hierarchical coherency management mode; and
a second list to identify cache locations associated with the flat coherency management mode.

* * * * *